US007096456B2

(12) United States Patent
Hanson et al.

(10) Patent No.: US 7,096,456 B2
(45) Date of Patent: Aug. 22, 2006

(54) METHOD AND APPARATUS FOR PROVIDING DYNAMICALLY SCOPED VARIABLES WITHIN A STATICALLY SCOPED COMPUTER PROGRAMMING LANGUAGE

(75) Inventors: David R. Hanson, Redmond, WA (US); Todd A. Proebsting, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 613 days.

(21) Appl. No.: 10/159,710

(22) Filed: May 31, 2002

(65) Prior Publication Data

US 2003/0110470 A1 Jun. 12, 2003

Related U.S. Application Data

(60) Provisional application No. 60/337,350, filed on Nov. 30, 2001.

(51) Int. Cl.
*G06F 9/45* (2006.01)
(52) U.S. Cl. .................................................. 717/114
(58) Field of Classification Search ................ 717/114
See application file for complete search history.

(56) References Cited

U.S. PATENT DOCUMENTS 5,500,881 A * 3/1996 Levin et al. ................ 717/141
5,748,961 A * 5/1998 Hanna et al. ............... 717/145
5,826,087 A * 10/1998 Lohmann .................... 717/146

OTHER PUBLICATIONS

Chase, D.R. Implementation of Exception Handling, Part I. The Journal of C Language Translation 5 (4), 229-40, Jun. 1994.
Fraser, C.W. and D. R. Hanson. A Retargetable C Compiler: Design and Implementation. Menlo Park, CA, Addison-Wesley, 1995.
Gosling, J., B. Joy, G. Steele, and G. Bracha. The Java Language Specification (Second Edition). Boston, Addison-Wesley, 2000.
Griswold, R.E. and M.T. Griswold. The Icon Programming Language (Third Edition). San Jose, CA, Peer-to-Peer Communications, 1997.
Hanson, D.R. and M. Raghavachari. A Machine-Independent Debugger. Software-Practice and Experience 26(11), 1277-99. Nov. 1996.
Lewis, J.R., M.B. Shields, E. Meijer, and J. Launchbury. Implicit Parameters: Dynamic Scoping With Static Types. Conference Record of the 27th ACM SIGACT-SIGPLAN Symposium on Principles of Programming Languages, Boston, 108-18. Jan. 2000.
Lindholm, T. and F. Yellin. The Java Virtual Machine Specification (Second Edition). Palo Alto, CA, Addison-Wesley, 1999.
Nelson, G. Systems Programming With Modula-3, Englewood Cliffs, N.J., Prentice Hall, 1991.

(Continued)

*Primary Examiner*—John Chavis
(74) *Attorney, Agent, or Firm*—Merchant & Gould (57) ABSTRACT

A programming language is provided that permits the use of both dynamically scoped variables and statically scoped variables, and that allows a programmer to select which scoping is desired for a particular variable. The programming language comprises at least one language construct for defining statically scoped variables to be used if a static scoped variable is desired and at least one language construct for defining dynamically scoped variables to be used if a dynamically scoped variable is desired. A method, apparatus, and computer-readable medium are also provided.

16 Claims, 11 Drawing Sheets

OTHER PUBLICATIONS

Proebsting, T.A. and G.M. Townsend. A New Implementation of the Icon Language. Software-Practice and Experience 30 (8), 925-72. Jul. 2000.

Richter, J. Advanced Windows (Third Edition). Redmond, WA, Microsoft Press, 1997.

Scott, M.L. Programming Language Pragmatics. San Francisco, Morgan Kaufmann, 2000.

* cited by examiner

METHOD AND APPARATUS FOR PROVIDING DYNAMICALLY SCOPED VARIABLES WITHIN A STATICALLY SCOPED COMPUTER PROGRAMMING LANGUAGE

CROSS REFERENCE TO RELATED APPLICATIONS

This application claims the benefit of provisional U.S. patent application No. 60/337,350, filed Nov. 30, 2001, and which is expressly incorporated herein by reference.

BACKGROUND OF THE INVENTION

Most modern programming languages use static (also called "lexical") scope rules for associating uses of identifiers, or variables, with their declarations. In a statically scoped language, the scope of a variable is fixed at compile time to some region in the source code containing the variable's declaration. This means that an identifier is only accessible within that region, including procedures declared within the region. Static scoping has been widely implemented because it is easy for programmers to use, helps catch errors at compile time, and because it can be implemented efficiently.

Another type of variable scoping is dynamic scope. Using dynamic scope the scope of the variable depends on the nesting of procedure and function calls at run time. While most modern languages use static scope, some popular languages, including PERL, TCL, TEX, and POSTSCRIPT, offer dynamic scope because it is useful in certain situations. For instance, dynamic scope is particularly useful in applications and libraries that operate in a customizable environment. Full-featured graphical user interface ("GUI") packages are good examples. These packages support a plethora of style and presentation features that must be programmed in some way. Even many non-GUI applications have some of these characteristics that make dynamic variables useful. For example, compilers often have options that permit clients to specify target machines, compiler passes, linker options, and other features. Moreover, compilers in integrated development environments typically have more options because their clients are other programs. Dynamically scoped variables make access to these features and options very easy.

Without inherent support within a programming language for dynamically scoped variables, such as within a statically scoped language, programming these kinds of features must be done explicitly in terms of the implementation language. Therefore, programmers typically simulate dynamic scope to implement these kinds of features in statically scoped languages. Usually, objects are loaded up with fields or methods that implement these features, or methods and functions are utilized that have a large number of parameters. In extreme cases, programmers move the many fields or parameters into an object, which is passed as a parameter nearly everywhere. Methods are called to read, write, save, and restore these data.

While programming dynamically scoped variables explicitly in a statically scoped programming language provides some of the benefits of dynamic scoping, this approach is not without its drawbacks. In particular, many of these implementations are unstructured, often not type-safe and inefficient in many cases. Moreover, this approach is not easy to use in that it requires that a programmer to explicitly create support for dynamically scoped variables themselves. Additionally, the use of objects with a large number of parameters can be confusing for programmers to use.

Therefore, in light of the above, there is a need for a method and apparatus for providing language constructs for introducing and referencing dynamically scoped variables within an otherwise statically scoped programming language.

SUMMARY OF THE INVENTION

Embodiments of the present invention solve the above-described problems by providing a programming language, method, apparatus, and computer-readable medium that enable the use of dynamically scoped variables within otherwise statically scoped programming languages. In particular, according to one embodiment of the present invention, a programming language is provided that permits the use of both dynamically scoped variables and statically scoped variables, and that allows a programmer to select which scoping is desired for a particular variable. In one embodiment, the programming language comprises at least one language construct for defining statically scoped variables to be used if a static scoped variable is desired and at least one language construct for defining dynamically scoped variables to be used if a dynamically scoped variable is desired.

More specifically described, the programming language provided according to one embodiment of the present invention comprises a language construct for defining an instance of a dynamically scoped variable, also referred to herein as a "dynamic variable", and for defining a scope for the instance of the dynamic variable. The scope for the dynamic variable may comprise an executable code segment, such as a thread and all of the functions called from within the thread, or other defined portion of executable code. In various embodiments of the present invention, the language construct for defining a dynamic variable may include a parameter for specifying a data type for the dynamic variable or a parameter for setting an initial value for the dynamic variable.

The programming language provided according to one embodiment of the present invention also comprises a language construct for referencing, or accessing, dynamically scoped variables. In particular, the language construct for referencing a dynamic variable includes a parameter for defining a scope within which the instance of the dynamic variable should be used. The dynamically scoped variable is bound only once to a local variable by the same name to allow its use within the specified scope.

According to one embodiment of the present invention, the language construct for referencing a dynamic variable includes a parameter for specifying a data type for the dynamic variable. In this embodiment, the local variable is only bound to the dynamically scoped variable if the type of the local variable is the same data type or a subtype of the data type specified for the dynamic variable. By matching types of a local variable and a dynamic variable in this manner, embodiments of the present invention ensure that software components utilized in a programming environment implementing the present invention will continue to function.

In one embodiment of the present invention, the language construct for defining dynamically scoped variables and the language construct for referencing dynamically scoped variables are implemented through the use of a linked list having a node for each dynamic variable. When the construct for defining a dynamically scoped variable is first executed a new node is created in the list corresponding to the dynamic variable. When the construct for referencing a dynamically scoped variable is executed, the linked list is searched until a node corresponding the dynamic variable to be referenced is located. A local variable is then bound to the instance of the dynamic variable identified in the linked list, thereby causing read and write operations on the local variable to be performed on the dynamic variable. When the scope associated with the construct for referencing a dynamically scoped variable is exited, the node corresponding to the dynamic variable is removed from the linked list, thereby destroying the dynamic variable.

In another actual embodiment of the present invention, the language construct for defining dynamically scoped variables and the language construct for referencing dynamically scoped variables are implemented through the use of a dynamic variable table that is created at compile time. The dynamic variable table contains an entry for each dynamic variable utilized in a program. Each entry includes the boundaries of an executable code segment in which the dynamic variable is defined, the data type for the instance of the dynamic variable, and a name for the instance of the dynamic variable.

When a language construct for referencing a dynamically scoped variable is executed, the dynamic variable table is consulted to locate an entry in the table wherein the current program counter, or a suspended program counter of a calling function, is within the defined boundaries for the dynamic variable. If the name specified in the located entry is the same as the local variable and the type specified in the located entry is the same type or a subtype of the local variable, the local variable is bound to the dynamic variable specified in the dynamic variable table. This embodiment of the present invention uses fewer processing cycles than other implementations in the case where dynamic variables are defined within a program but not utilized.

A method, computer-readable medium, and computer-controlled apparatus are also provided for enabling the use of dynamically scoped variables in a statically scoped programming language. Additional details regarding the various embodiments of the present invention will become apparent from the Detailed Description that follows.

DETAILED DESCRIPTION OF AN ILLUSTRATIVE EMBODIMENT

As described briefly above, embodiments of the present invention provide a method, apparatus, programming language, and computer-readable medium for enabling dynamic variables within a statically scoped programming language. Referring now to the figures, in which like numerals represent like elements, one or more illustrative embodiments of the invention will be described. In particular, embodiments of the invention will be described that provide a programming language implemented by a compiler executing on a computer. Aspects of the syntax for utilizing features of the programming language for defining and referencing dynamic variables will be described as well as several methods for implementing support for dynamic variables within an otherwise statically scoped programming language.

Figure 1:
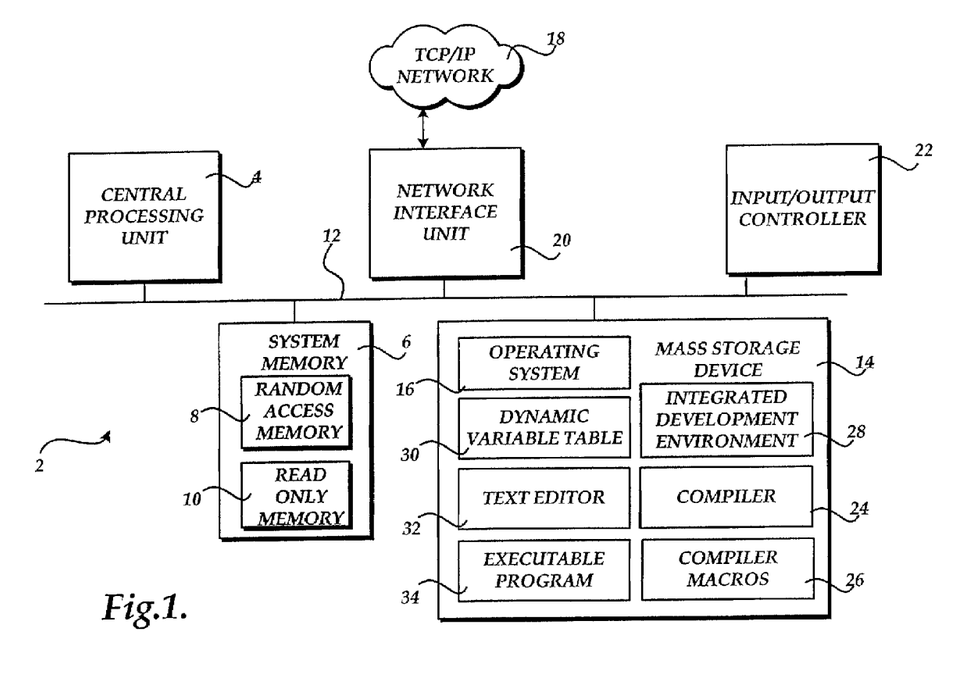
FIG. 1 is a block diagram showing an illustrative architecture for a computer utilized to practice various embodiments of the present invention.

Turning now to FIG. 1, an illustrative computer architecture for a computer 2 for practicing the various embodiments of the invention will be described. The computer architecture shown in FIG. 1 illustrates a conventional computer system, including a central processing unit 4 ("CPU"), a system memory 6, including a random access memory 8 ("RAM") and a read-only memory ("ROM") 10, and a system bus 12 that couples the memory to the CPU 4. A basic input/output system containing the basic routines that help to transfer information between elements within the computer, such as during startup, is stored in the ROM 10. The personal computer 2 further includes a mass storage device 14 for storing an operating system 16, programs, such as a compiler 24 and a text editor 32, and data.

The mass storage device 14 is connected to the CPU 4 through a mass storage controller (not shown) connected to the bus 12. The mass storage device 14 and its associated computer-readable media, provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed by the computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

According to various embodiments of the invention, the computer 2 may operate in a networked environment using logical connections to remote computers through a TCP/IP network 18, such as the Internet. The computer 2 may connect to the TCP/IP network 18 through a network interface unit 20 connected to the bus 12. It should be appreciated that the network interface unit 20 may also be utilized to connect to other types of networks and remote computer systems. The computer 2 may also include an input/output controller 22 for receiving and processing input from a number of devices, including a keyboard or mouse (not shown). Similarly, an input/output controller 22 may provide output to a display screen, a printer, or other type of output device.

As mentioned briefly above, a number of program modules and data files may be stored in the mass storage device 14 and RAM 8 of the computer 2, including an operating system 16 suitable for controlling the operation of a networked computer, such as the WINDOWS XP operating system from MICROSOFT CORPORATION of Redmond, Wash. Other types of suitable operating systems may also be utilized. The mass storage device 14 and RAM 8 may also store one or more executable programs. In particular, the mass storage device 14 and RAM 8 may store a compiler 24. As known to those skilled in the art, a compiler 24 translates source code written in a high-level language into an executable program 34 so that the executable program 34 may be executed on the computer 2. It should be appreciated that the various embodiments of the present invention may be implemented with regard to any programming language that utilizes only statically scoped. Therefore, the compiler 24 may be a compiler for use with the C programming language, the C++ programming language, the JAVA programming language from SUN MICROSYSTEMS, or any other statically scoped programming language.

According to the various embodiments of the present invention, the mass storage device 14 and the RAM 8 may also store a text editor 32 for composing program source code. Alternatively, an integrated development environment 28 for composing source code may be utilized. As known to those skilled in the art, the integrated development environment 28 allows a programmer to create a GUI, control the compiler 24, debug code, and perform other programming tasks within a single environment. The storage device 14 and the RAM 8 may also store one or more compiler macros 26 or a dynamic variable table 30. As will be described in greater detail below, the compiler macros 26 may be utilized to implement dynamic variables in one embodiment of the invention and the dynamic variable table 30 may be utilized to implement dynamic variables in another embodiment of the invention. Additional details regarding the compiler macros 26 will be provided below with respect to FIGS. 5–7. Additional details regarding the dynamic variable table 30 and its use will be provided below with respect to FIGS. 8–11.

Figure 2:
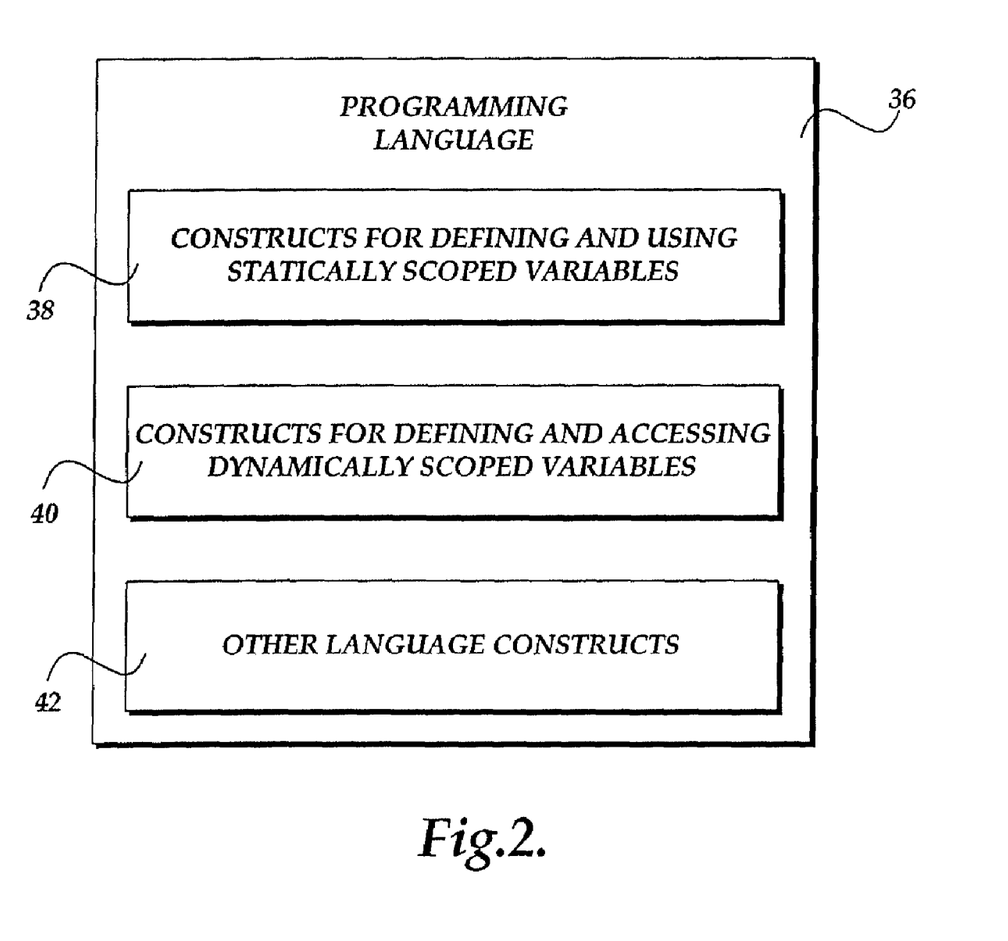
FIG. 2 is a block diagram illustrating various aspects of a programming language provided in one embodiment of the present invention.

Referring now to FIG. 2, various aspects of a programming language provided in one embodiment of the present invention will be described. As shown in FIG. 2, a programming language 36 is provided according to one embodiment of the present invention that includes at least one language construct 38 for defining and using statically scoped variables. The language constructs 38 comprise those typically included within a statically scoped programming language, such as the C programming language, for defining and referencing statically scoped variables. These constructs are well known to those skilled in the art.

The programming language 36 provided herein also includes one or more language constructs 40 for defining and referencing dynamically scoped variables. A programmer may choose whether the use the constructs 38 to create and use a statically scoped variable or to use the constructs 40 to create and use a dynamically scoped variable. Both types of variables may be used within a single program.

According to various embodiments of the present invention, the constructs 40 for creating and using a dynamically scoped variable may include parameters for identifying an instance of a dynamically scoped variable and for defining a scope for the instance of the dynamically scoped variable. The constructs 40 for creating and using a dynamically scoped variable may also include parameters for specifying a data type for the instance of the dynamic variable and for specifying an initial value for the dynamic variable. Additional details regarding the syntax and usage of language constructs 40 for creating and referencing dynamic variables will be described in greater detail below with reference to FIG. 4. As known to those skilled in the art, the programming language 36 may also include other language constructs 42 for controlling program flow, making decisions, declaring data structures, performing arithmetic operations, and performing other functions typical of a modern statically scoped programming language.

Figure 3:
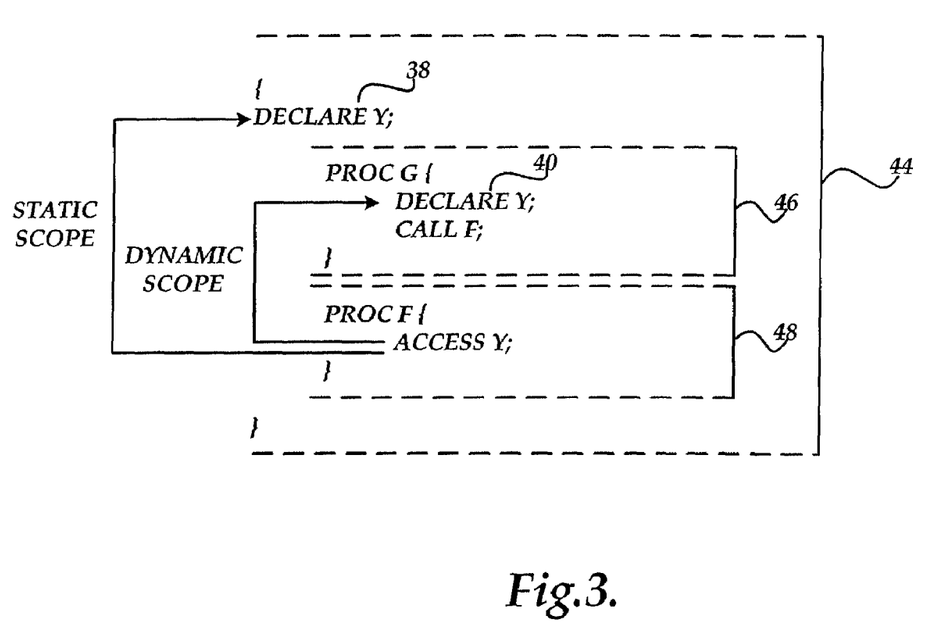
FIG. 3 is a block diagram illustrating the scope of a dynamic variable and a static variable within an illustrative segment of program code.

Turning now to FIG. 3, an illustrative segment of program source code will be described that shows the difference in scope between a dynamically scoped variable and a statically scoped variable. As described briefly above, in a statically scoped language the scope of a variable is fixed at compile time to some region in the source code containing the variable's declaration. This means that an identifier is only accessible within that region, including procedures declared within the region.

For instance, as shown in FIG. 3, a program code segment 44 includes a variable declaration 38 for a variable "Y" in its main body. The code segment 44 also includes a procedure 46 that includes another declaration of a variable called "Y" and a function call to a second procedure 48 called "F." The procedure 48 includes an access of a variable named "Y." If static scoping is utilized for the variable "Y", the access of "Y" in the procedure 48 is bound to the instance of "Y" declared in the body of the code segment by the declaration 38. In contrast, when using dynamically scoped variables the scope of the variable depends on the nesting of procedure and function calls at run time. Therefore, if dynamic scoping is utilized for the variable "Y", the access of "Y" in the procedure 48 is bound to the instance of "Y" declared in the procedure 46 by the declaration 40.

Figure 4:
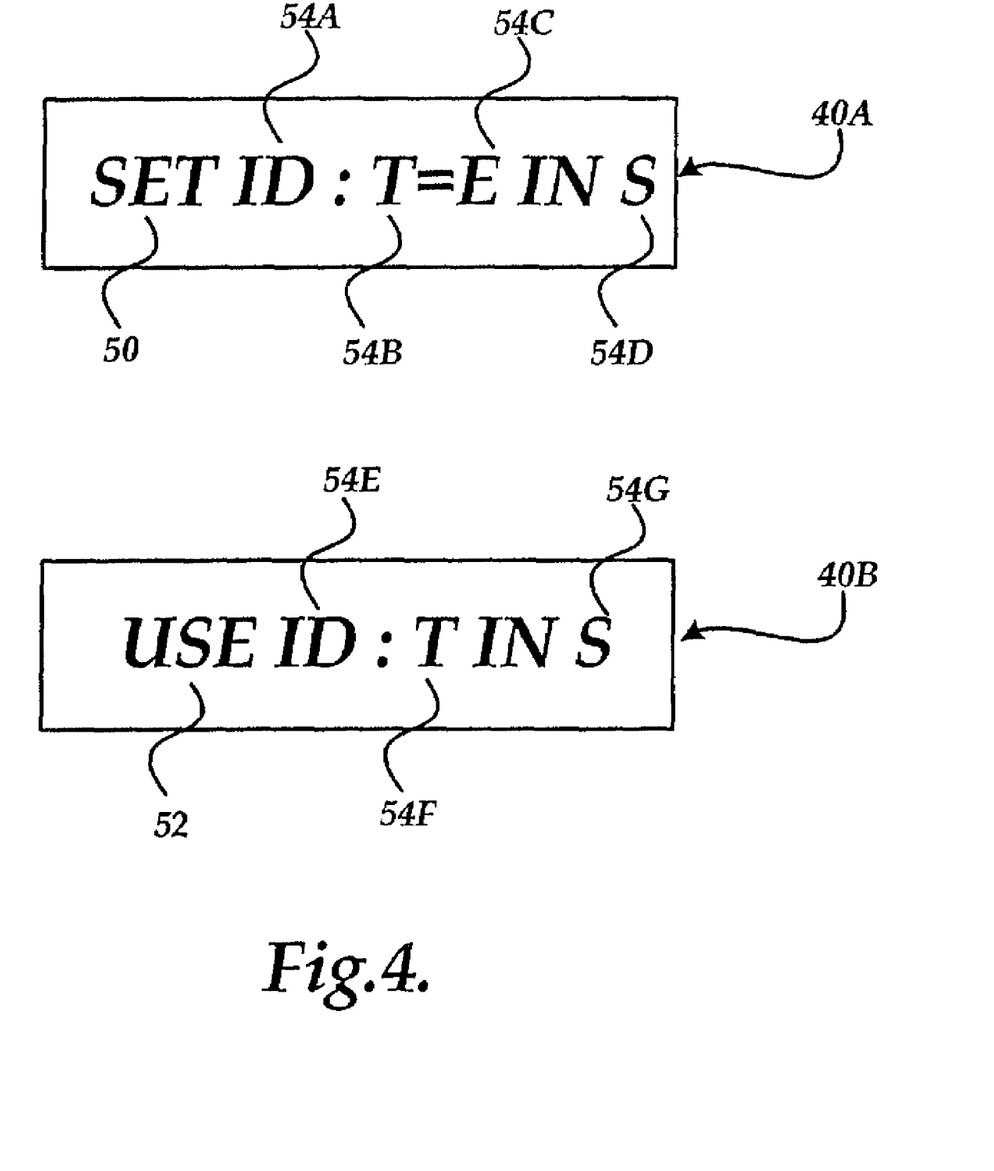
FIG. 4 is a block diagram illustrating aspects of language constructs for declaring and accessing dynamically scoped variables provided by various embodiments of the present invention.

Referring now to FIG. 4, aspects of several language constructs for declaring and accessing dynamically scoped variables provided in an actual embodiment of the present invention will be described. As shown in FIG. 4, a language construct 40A is provided for defining one or more dynamically scoped variables. The language construct 40A instantiates and initializes a dynamic variable.

According to one embodiment of the invention, the language construct 40A includes a parameter 50 identifying the construct 40A. In this embodiment, the parameter 50 comprises the word "SET", however, any suitable term may be utilized. The construct 40A also includes a parameter 54A for naming the dynamic variable. In FIG. 4, the parameter 54A is referred to as "ID." According to one embodiment, the construct 40A also includes a parameter 54B for specifying the data type for the variable identified by the parameter 54A. The construct 40A may also include a parameter 54C for specifying an initial value for the instance of the dynamically scoped variable.

The construct 40A also includes a parameter 54D, that defines the scope in which the defined dynamic variable may be utilized. The scope may comprise any executable code segment. When the construct 40A is utilized, the dynamic variable identified by the parameter 54A is instantiated and initialized to the value specified by the parameter 54C and the code identified by the parameter 54D is executed. The variable identified by the parameter 54A is visible within the scope defined by the parameter 54D and may be read and written within the scope. According to one embodiment of the invention, the type of data initialized by the parameter 54C must be a subtype of data type specified by the parameter 54B or be assignable to identifiers of type specified by the parameter 54B. The lifetime and scope of the variable identified by the parameter 54A is restricted to the scope specified by the parameter 54D; when the scope terminates, the dynamic variable is destroyed. According to one embodiment, a single construct 40A may contain multiple declarations, which are evaluated sequentially. As an illustration, the construct "SET $id_1$: $T_1$=$e_1$, $id_2$: $T_2$=$e_2$, . . . , $id_n$: $T_n$=$e_n$ in S" is equivalent to the sequence of statements shown in Table 1.

TABLE 1

SET $id_1$ : $T_1$ = $e_1$ in
SET $id_2$ : $T_2$ = $e_2$ in
SET ... in
SET $id_n$ : $T_n$ = $e_n$ in S

As shown in FIG. 4, a language construct 40B is also provided for referencing one or more dynamically scoped variables. The language construct 40A accesses a dynamic variable previously introduced through the use of the construct 40A. According to one embodiment of the invention, the language construct 40B includes a parameter 52 identifying the construct 40B. In this embodiment, the parameter 52 comprises the word "USE", however, any suitable term may be utilized.

The construct 40B also includes a parameter 54E for identifying the dynamic variable that should be referenced. Parameters 54F and 54G are also provided for specifying a data type for the dynamic variable to be utilized and a scope, respectively. When the construct 40B is utilized, the local variable identified by the parameter 54E is bound by reference to a previously defined dynamic variable and the code segment specified by the parameter 54G is executed. The scope of the local variable introduced by the construct 40B is restricted to the scope specified by the parameter 54G, and the variable may be read and written within the scope specified by the parameter 54G.

According to one embodiment, the local variable identified by the parameter 54E is bound to the most recently created dynamic variable with the lexographically identical name and for which the type specified by the parameter 54B is the same type or a subtype of the data type specified by the parameter 54F. Types are considered in binding the identifier in the construct 40B to ensure that a variable reference through the use of the construct 40B binds to the correct dynamic variable defined by a construct 40A. According to one embodiment, a single construct 40B can contain multiple references, which are evaluated sequentially. As an illustration, the construct "USE $id_1$: $T_1$, $id_2$: $T_2$, . . . , $id_m$: $T_m$ in S" is equivalent to the sequence of statements shown in Table 2.

TABLE 2

USE $id_1$ : $T_1$ in
USE $id_2$ : $T_2$ in
USE ... in
USE $id_m$ : $T_m$ in S

Figure 5:
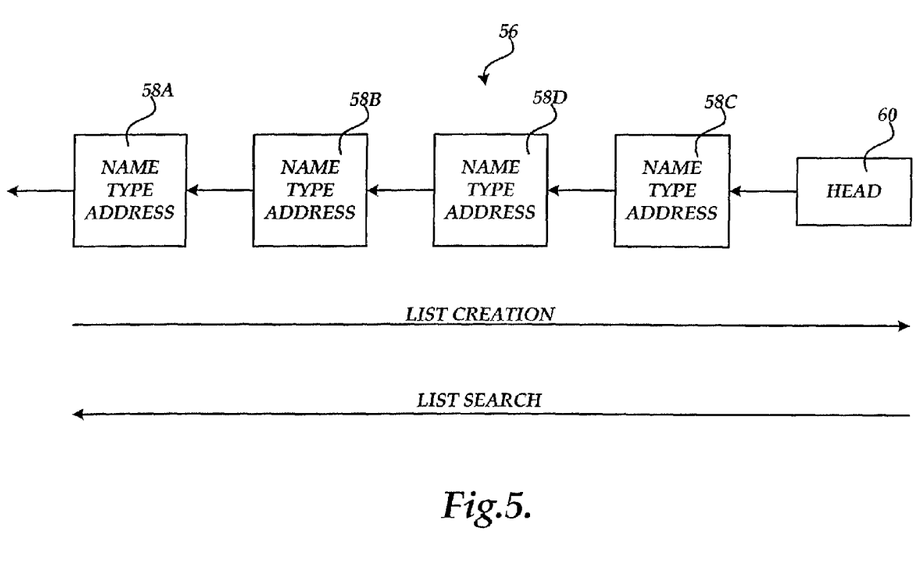
FIG. 5 is a block diagram illustrating aspects of a linked list utilized in one embodiment of the invention to provide dynamically scoped variables.

Referring now to FIG. 5, aspects of one method for implementing the constructs 40A and 40B will be described. According to this embodiment of the invention, compiler macros 26 are defined that implement the functionality for providing dynamic variables within a statically scoped programming language. However, it should be appreciated that this embodiment may also be implemented within a compiler or through other means. In particular, the use of the construct 40A creates a set of one or more dynamic variables and pushes the set onto a global stack of such sets. Reaching the end of the scope specified in the construct 40A pops the stack. The construct 40B searches the sets from the top of the stack down for each identifier defined by the construct 40A. If the identifier is found, the construct 40B stores the address of the dynamic variable in a local variable of the same name. Within the construct 40B, references to dynamic variables are compiled into the appropriate indirections.

One actual implementation of macro-based dynamic variables utilizes a linked list 56 to simulate a stack. As shown in FIG. 5, the linked list 56 comprises a number of nodes 58 and a per-thread global variable 60 that points to the head of the linked list. Each node 58 comprises a data structure that defines the name of the dynamic variable, the data type of the dynamic variable, and the memory address for the dynamic variable. Table 3 shows C code for defining each node of the linked list 56.

TABLE 3 struct DVARIABLE {
    struct DVARIABLE *link;
    const char *NAME;
    Type *TYPE;
    void * ADDRESS;
} *CURRENT = 0;

In the code segment shown in Table 3, DVARIABLE instances are linked via the LINK field and the NAME field points to the name of the variable. The TYPE field points to a type descriptor sufficient for testing the sub-type relation and the ADDRESS field holds the address of the dynamic variable. A per-thread global variable, CURRENT, points to the head of the list of DVARIABLES. The execution of the construct 40A for declaring a dynamic variable in this embodiment of the invention is described below with respect to FIG. 6. The execution of the construct 40B for referencing a dynamic variable in this embodiment of the invention is described below with respect to FIG. 7.

Figure 6:
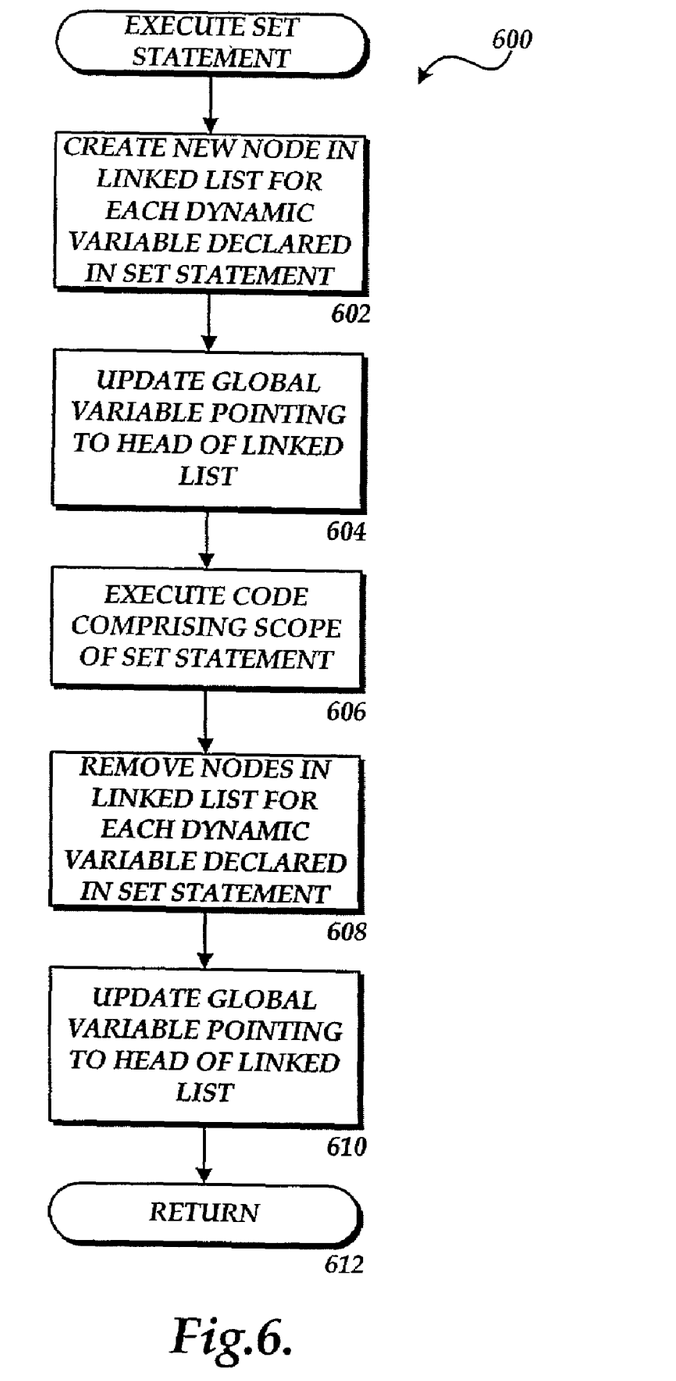
FIG. 6 is a flow diagram illustrating the execution of a language construct for declaring dynamically scoped variables according to one embodiment of the present invention.

Turning now to FIG. 6, an illustrative routine 600 will be described for executing a language construct 40A for declaring dynamically scoped variables according to an embodiment of the invention wherein a linked list 56 is utilized to maintain the list of dynamic variables. The routine 600 begins at block 602, where a new node 58 is created in the linked list 56 for each dynamic variable identified in the language construct 40A. In particular, as described above with respect to FIG. 5, a node 58 is added for each variable that includes the name of the dynamic variable, the data type of the dynamic variable, and the memory address for the dynamic variable. According to one embodiment, memory space for the new node may be allocated at compile time, thereby avoiding dynamic memory allocation during execution. The routine 600 then transitions from block 602 to block 604.

At block 604, the global variable 60 is updated so that it points to the node that is at the head of the linked list. The routine 600 then continues to block 606, where code identified in the scope of the language construct 40A is executed. As described above with respect to FIG. 4, the code may be identified in parameter 54D utilized in conjunction with the language construct 40A. Once the code has completed its execution, the routine 600 continues to block 608, where each of the declared dynamic variables are destroyed. In particular, each of the nodes 58 created for the dynamic variables declared by the language construct 50A are removed from the linked list 56. The routine 600 then continues to block 610, where the global variable 60 is updated to point to the new head of the linked list 56. The routine 600 then continues to block 612, where it ends.

Figure 7:
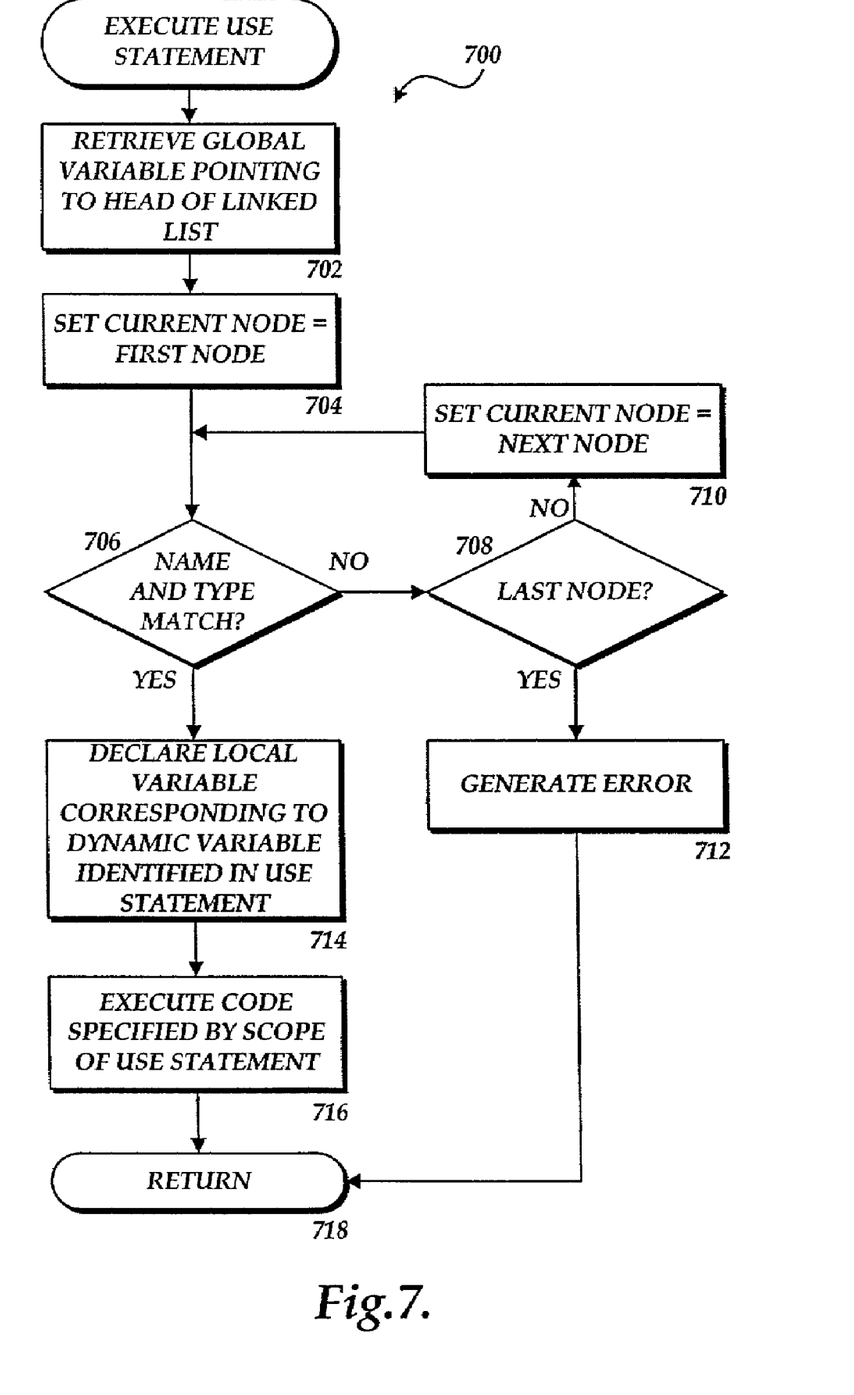
FIG. 7 is a flow diagram illustrating the execution of a language construct for accessing dynamically scoped variables provided in one embodiment of the invention.

Turning now to FIG. 7, an illustrative routine 700 will be described for executing a language construct 40B for referencing dynamically scoped variables according to an embodiment of the invention wherein a linked list 56 is utilized to maintain the list of dynamic variables. The routing 700 begins at block 702, where the global variable 60 pointing to the head of the linked list 56 is retrieved. The routine 700 then continues to block 704, where a temporary variable is created that identifies a current node in the linked list and the variable is set to the node 58 at the head of the linked list 56.

From block 704, the routine 700 continues to block 706, where a determination is made as to whether the dynamic variable identified in the language construct 40B matches the node 58 identified as the current node of the linked list 56. In particular, a determination is made as to whether the dynamic variable identified in the language construct 40B has a name matching the dynamic variable defined in the current node of the linked list 56. Additionally, a determination is made as to whether the type of the dynamic variable identified in the language construct 40B is the same type or a subtype of the variable defined in the current node of the linked list 56. If the name and type match, the routine 700 continues from block 706 to block 714. If the name and type do not match, the routine 700 branches to block 708.

At block 708, a determination is made as to whether the current node of the linked list 56 is the last node in the linked list 56. If the current node is the last node in the linked list, the routine 700 branches to block 712, where an error is generated. Generating an error may comprise raising an exception, generating an error, aborting the program, assigning a default value to the variable defined by the language construct 50B, or performing another type of action. From block 712, the routine 700 continues to block 718, where it ends.

If, at block 708, it is determined that the current node is not the last node in the linked list 56, the routine 700 branches to block 710, where the variable identifying the current node in the linked list 56 is set to the next node in the linked list 56. The routine 700 then continues from block 710 to block 706. In this manner, this embodiment of the invention performs a linear search of the linked list 56. It should be appreciated, however, that other types of searches on a linked list 56 may also be utilized.

If, at block 706, it is determined that the name and type of the dynamic variable defined by the language construct 50B match the variable defined in the current node of the linked list 56, the routine 700 continues from block 706 to block 714. At block 714, a local variable is defined with the same name as the defined dynamic variable. The local variable is also bound to the dynamic variable so that any reads or writes performed on the local variable will be performed on the dynamic variable identified in the current node of the linked list. The routine 700 then continues to block 716, where the program code identified in the scope of the language construct 50B is executed. Once the code has been executed, the routine 700 continues to block 718, where it ends.

Figure 8:
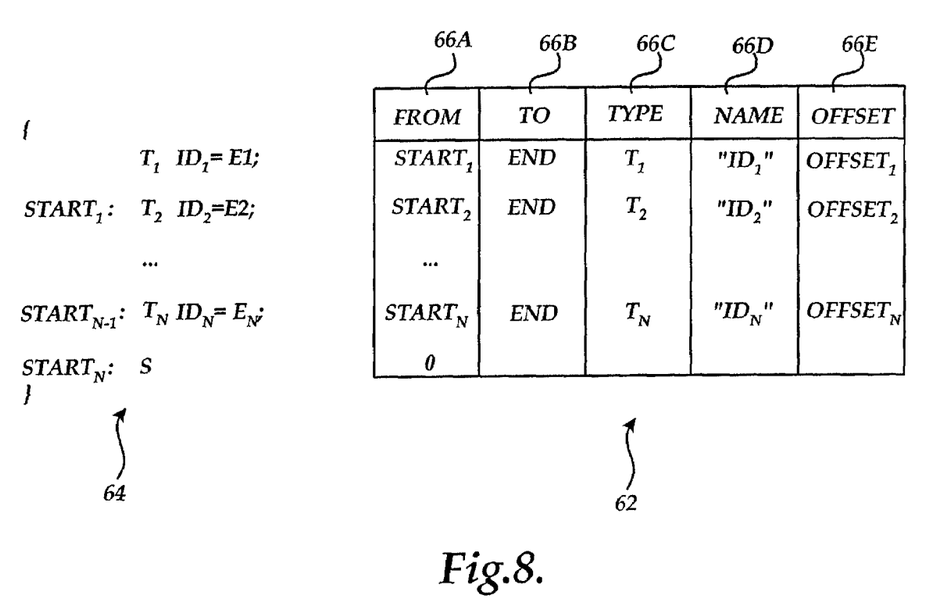
FIG. 8 is a block diagram illustrating aspects of a dynamic variable table utilized in one embodiment of the present invention.

Referring now to FIG. 8, aspects of a dynamic variable table utilized in another embodiment of the present invention will be described. As described briefly above, one embodiment of the present invention utilizes a dynamic variable table 62 to bind local variables to declared dynamic variables at run time. The dynamic variable table 62 is created at compile time and includes all of the information necessary to locate any defined dynamic variable.

According to one actual embodiment of the invention, the dynamic variable table 62 includes fields 66A–66E. The field 66A identifies a memory address corresponding to the start of a language construct 50A that defines a dynamic variable. The field 66B identifies a memory address corresponding to the end of a language construct 50B that defines a dynamic variable. As will be described in greater detail with reference to FIG. 11 below, the fields 66A–B can be utilized to locate and reference a dynamic variable defined by a language construct 50A by comparing the values of the fields 66A–B to a current or suspended program counter value.

The dynamic variable table 62 also includes a field 66C that identifies the data type for the defined dynamic variable and a field 66D that identifies the name for the declared dynamic variable. The dynamic variable table 62 further includes a field 66E that identifies an offset from a frame pointer for the actual memory location of the dynamic variable. As will be described in greater detail below with reference to FIG. 11, the contents of the field 66E are used in conjunction with a frame pointer to locate the actual memory address for the dynamic variable. The dynamic variable table 62 shown in FIG. 8 is populated with entries in fields 66A–66E corresponding to the code segment 64. Additional aspects regarding the creation and use of the dynamic variable table 62 will be described below with reference to FIGS. 9–11.

Figure 9:
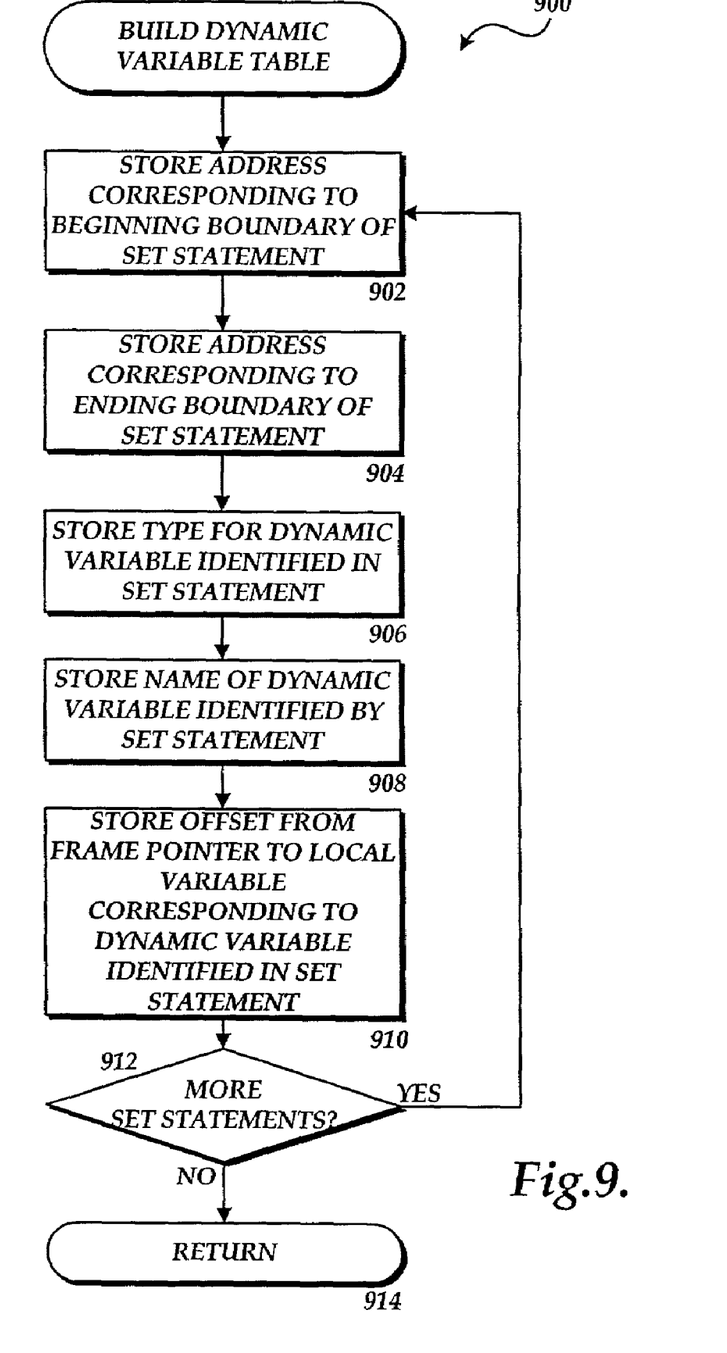
FIG. 9 is a flow diagram illustrating a procedure for building a dynamic variable table according to one embodiment of the present invention.

Turning now to FIG. 9, a flow diagram illustrating a routine 900 for building a dynamic variable table 62 according to one embodiment of the present invention will be described. As mentioned above, the routine 900 is performed at compile time. The routine 900 begins at block 902, where the memory address corresponding to the beginning of a language construct 50A is stored in field 66A of the dynamic variable table 62. The routine 900 then continues to block 904, where the memory address corresponding to the end of a language construct 50A is stored in field 66B of the dynamic variable table 62.

From block 904, the routine 900 continues to block 906, where the data type for the dynamic variable defined by the language construct 50A is stored in field 66C of the dynamic variable table 62. The routine 900 then continues from block 906 to block 908, where the name of the dynamic variable is stored in field 66D of the dynamic variable table 62. The routing 900 then continues to block 910, where the offset from the frame pointer for the current procedure to the local variable corresponding to the defined dynamic variable is stored in the field 66E of the dynamic variable table 62.

From block 910, the routine 900 continues to block 912, where a determination is made as to whether additional language constructs 50A remain for which an entry in the dynamic variable table 62 should be created. If additional language constructs 50A remain, the routine 900 branches back to block 902. If no additional language constructs 50A remain, the routine 900 continues to block 914, where it ends.

Figure 10:
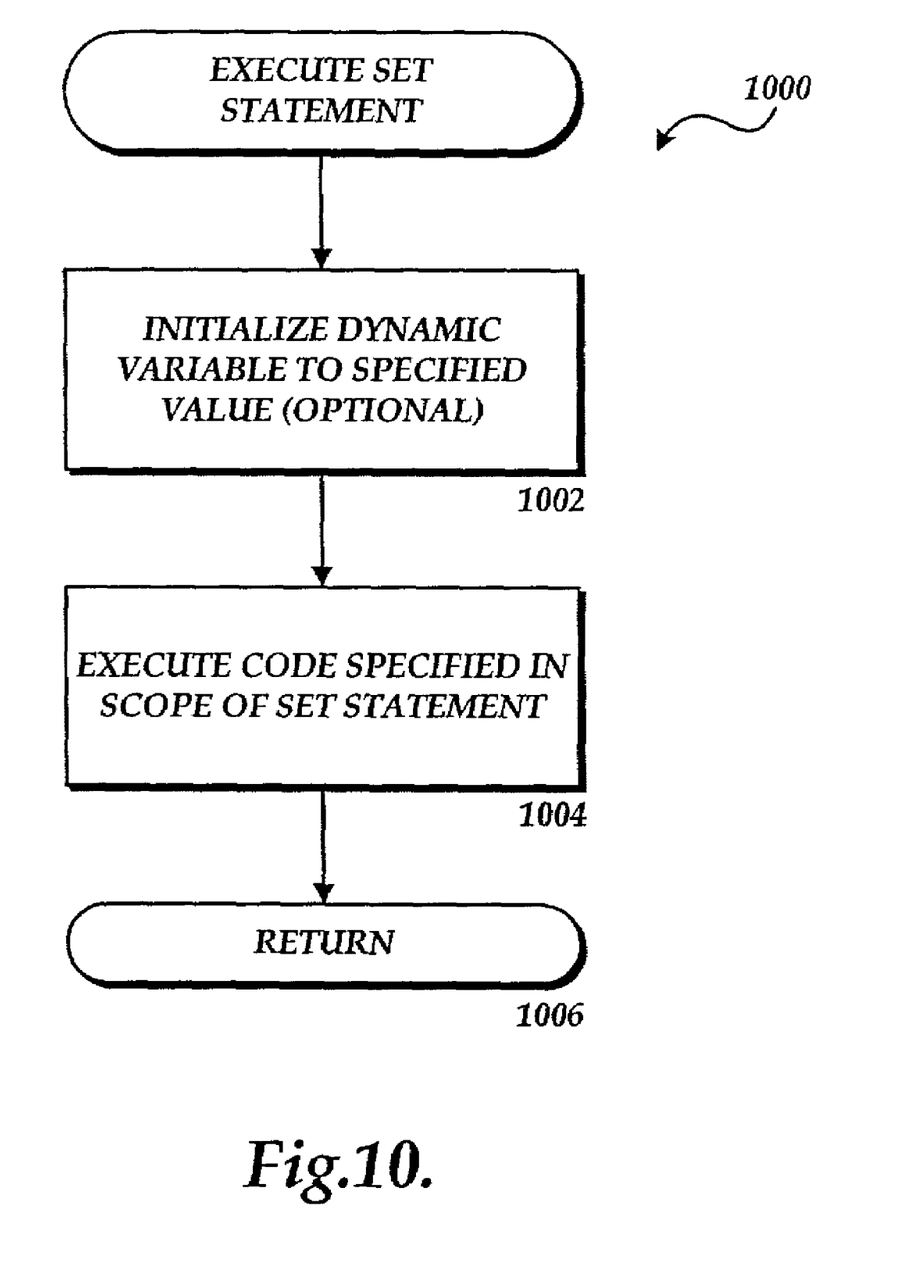
FIG. 10 is a flow diagram illustrating the execution of a language construct for declaring dynamically scoped variables according to another embodiment of the present invention.

Referring now to FIG. 10 a flow diagram illustrating a routine 1000 for executing a language construct 50A for declaring dynamically scoped variables according to an embodiment of the present invention wherein a dynamic variable table is utilized will be described. Because the dynamic variable table 62 is created at compile time, no processing needs to be performed when a language construct 50A is encountered to define the dynamic variable. Accordingly, the routine 1000 begins at block 1002, where the dynamic variable may be optionally initialized to a default value. The routine 1000 then continues to block 1004, where the executable code identified in the scope of the language construct 40A is executed. As described above with respect to FIG. 4, the code may be identified in parameter 54D utilized in conjunction with the language construct 40A. Once the code has completed its execution, the routine 1000 continues to block 1006, where it ends.

Figure 11:
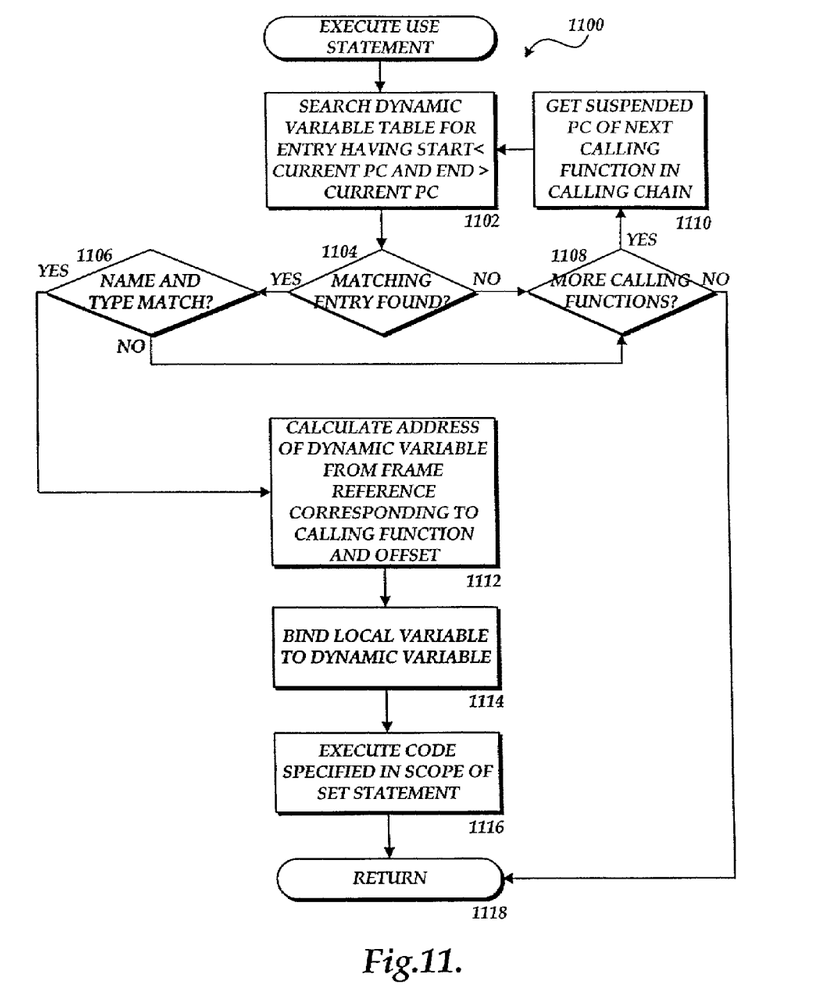
FIG. 11 is a flow diagram illustrating the execution of a language construct for accessing dynamically scoped variables in another embodiment of the invention.

Turning now to FIG. 11, a routine 1100 will be described illustrating the execution of a language construct 50B for accessing dynamically scoped variables in an embodiment of the present invention wherein a dynamic variable table is utilized. The routine 1100 begins at block 1102, where a search is performed on the dynamic variable table 62 for an entry where the value of the field 66A is less than the value of the current program counter and wherein the value of the field 66B is more than the value of the current program counter. The routine 1100 then continues to block 1104, where a determination is made as to whether a matching entry in the dynamic variable table 62 was located.

If, at block 1104, it is determined that no matching entry was found in the dynamic variable table 62, the routine 1100 branches to block 1108. At block 1108, a determination is made as to whether the current segment of program code was called by another function. If there is a calling function, the routine 1100 branches to block 1110, where the suspended program counter of the calling function is retrieved. The routine 1100 then continues from block 1110 to block 1102, where the dynamic variable table 62 is searched with the suspended program counter of the calling function. If, at block 1108, it is determined that no additional calling functions exist, the routine 1100 branches from block 1108 to block 1118, where it ends.

If, at block 1104, it is determined that a matching entry was located in the dynamic variable table 62, the routine 1100 branches to block 1106. At block 1106, a determination is made as to whether the dynamic variable identified in the language construct 40B matches entry in the dynamic variable table 62 during the search. In particular, a determination is made as to whether the dynamic variable identified in the language construct 40B has the lexicographically identical name as the dynamic variable defined in the matching entry in the dynamic variable table 62. Additionally, a determination is made as to whether the type of the dynamic variable identified in the language construct 40B is the same type or a subtype of the variable defined in the matching entry of the dynamic variable table 62. If the name and type match, the routine 1100 continues from block 1106 to block 1112. If the name and type do not match, the routine 1100 branches from block 1106 to block 1108.

At block 1112, the address of the dynamic variable is calculated using the offset value stored in field 66E of the identified entry in the dynamic variable table 62. The actual memory address is calculated by adding the offset stored in field 66E to the frame pointer corresponding to the calling function. Once the actual address has been located, the routine 1100 continues to block 1114, where a local variable is bound to the dynamic variable at the calculated address. In this manner, all reads and writes performed on the local variable during the life of the language construct 50B are performed on the dynamic variable. The routine 1100 then continues from block 1114 to block 1116, where the executable code defined by the scope of the language construct 50B is executed. Once the code execution has completed, the routine 1100 continues from block 1116 to block 1118, where it ends.

Based on the foregoing, it should be appreciated that the various embodiments of the present invention provide a programming language, method, apparatus, and computer readable medium for providing dynamically scoped variables in a statically scoped programming language. The above specification, examples and data provide a complete description of the manufacture and use of the composition of the invention. Since many embodiments of the invention can be made without departing from the spirit and scope of the invention, the invention resides in the claims hereinafter appended.

We claim:

1. A computer implemented method for providing a computer environment for utilizing a programming language, the programming language comprising a plurality of scoped variables, to enable a programmer to select a desired scoping for a particular variable when creating a computer program, the method comprising:
providing in the computer environment, at least one language construct for defining statically scoped variables to be used if a static scoped variable is desired; and
providing, in the computer environment, at least one language construct for defining dynamically scoped variables to be used if a dynamic scoped variable is desired, wherein the scope of an instance of the dynamically scoped variable comprises an executable code segment, the executable code segment comprising a thread and all of the functions called within the thread.

2. The method of claim 1, wherein the language construct for defining dynamically scoped variables comprises a statement for identifying the instance of a dynamically scoped variable and for defining the scope for the instance of the dynamically scoped variable.

3. The method of claim 2, wherein the language construct for defining dynamically scoped variables further comprises a parameter for specifying a data type for the instance of the dynamically scoped variable.

4. The method of claim 3, wherein the language construct for defining dynamically scoped variables further comprises a parameter for specifying an initial value for the instance of the dynamically scoped variable.

5. The method of claim 4 further comprising creating, in the computer environment, an entry in a table for the instance of the dynamically scoped variable when an instance of the language construct for defining dynamically scoped variables is compiled, the table entry comprising boundaries of the executable code segment, the data type for the instance of the dynamically scoped variable, and a name for the instance of the dynamically scoped variable.

6. The method of claim 5 further comprising at least one language construct for referencing dynamically scoped variables.

7. The method of claim 6, wherein the language construct for referencing dynamically scoped variables binds a variable to the instance of the dynamically scoped variable.

8. The method of claim 7, wherein the language construct for referencing dynamically scoped variables comprises a parameter for specifying a type for the variable, and wherein the variable is bound to the instance of the dynamically scoped variable only if the type of the instance of the dynamically scoped variable is the same type or a subtype of the type of variable.

9. The method of claim 8, wherein the language construct for referencing dynamically scoped variables comprises a statement for defining a scope for the variable.

10. The method of claim 9, wherein the variable is bound to the instance of the dynamically scoped variable only once for all accesses to the variable that occur within the scope of the variable.

11. A computer-readable medium having computer-executable instructions, which when executed on a computer, cause the computer to utilize a programming language, in which variables are statically scoped, to perform a method for providing dynamically scoped variables to be used in the creation of computer programs, the method comprising:
  providing within the programming language at least one construct for declaring dynamically scoped variables; and
  providing within the programming language at least one construct for accessing dynamically scoped variables in a defined scope, wherein the scope of an instance of a dynamically scored variable comprises an executable code segment, the executable code segment comprising a thread and all of the functions called within the thread.

12. The computer-readable medium of claim 11, wherein the construct for accessing dynamically scoped variables binds a variable to the instance of the dynamically scoped variable.

13. The computer-readable medium of claim 12, wherein the construct for accessing dynamically scoped variables comprises a parameter for specifying a type for the variable, and wherein the variable is bound to the instance of the dynamically scoped variable only if the type of the instance of the dynamically scoped variable is the same type or a subtype of the type of variable.

14. The computer-readable medium of claim 13, further comprising:
  creating an entry in a table corresponding to the instance of the dynamically scoped variable when an instance of the language construct for declaring dynamically scoped variables is compiled, the table entry comprising the boundaries of an executable code segment in which the dynamically scoped variable is defined, the data type for the instance of the dynamically scoped variable, and a name for of the instance of the dynamically scoped variable.

15. The computer-readable medium of claim 14, wherein binding the variable to the instance of the dynamically scoped variable comprises:
  locating an entry in the table wherein the identity of the variable is the same as the identity of the instance of the dynamically scoped variable and the data type of the instance of the dynamically scoped variable is the same data type or a subtype of the variable; and
  in response to locating the entry in the table, equating the instance of the dynamically scoped variable to the variable based upon the boundaries of the executable code segment identified in the located entry.

16. The computer-readable medium of claim 15, wherein equating the instance of the dynamically scoped variable to the variable comprises causing read and write operations on the variable to be performed on the dynamically scoped variable.

* * * * *